United States Patent [19]

Porter et al.

[11] Patent Number: 4,845,666
[45] Date of Patent: Jul. 4, 1989

[54] COMPUTER SYSTEM FOR PROCESSING BINARY NUMBERING FORMAT AND DETERMINING THE SIGN OF THE NUMBERS FROM THEIR TWO MOST SIGNIFICANT BITS

[75] Inventors: Thomas K. Porter, Fairfax; Adam E. Levinthal, Corte Madera, both of Calif.

[73] Assignee: Pixar, San Rafael, Calif.

[21] Appl. No.: 183,389

[22] Filed: Apr. 13, 1988

Related U.S. Application Data

[63] Continuation of Ser. No. 751,611, Jul. 2, 1985.

[51] Int. Cl.[4] ........................... G06F 5/00; G06F 7/49
[52] U.S. Cl. ................................. 364/900; 364/715.01
[58] Field of Search ... 364/200 MS File, 900 MS File, 364/715

[56] References Cited

U.S. PATENT DOCUMENTS 4,553,220  11/1985  Swanson ........................... 364/715

*Primary Examiner*—Raulfe B. Zache
*Assistant Examiner*—Emily Y. Chan
*Attorney, Agent, or Firm*—Hecker & Harriman

[57] ABSTRACT

A computer binary numbering system which allows for over range values and determines the sign of the numbers from their two most significant bits. The technique has a particular advantage in computer graphics systems.

9 Claims, 2 Drawing Sheets

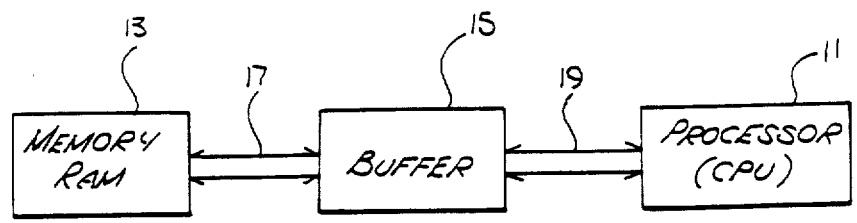
Fig. 1
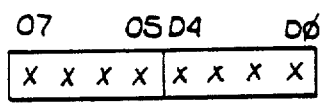
Fig. 2
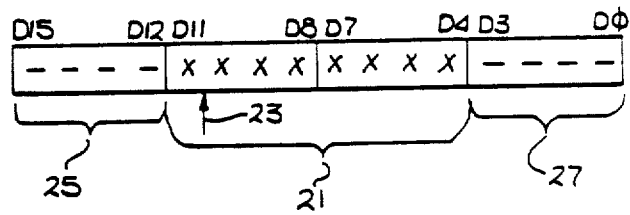
Fig. 3
Fig. 4

COMPUTER SYSTEM FOR PROCESSING BINARY NUMBERING FORMAT AND DETERMINING THE SIGN OF THE NUMBERS FROM THEIR TWO MOST SIGNIFICANT BITS

This is a continuation of application Ser. No. 751,611 filed 7/2/85.

BACKGROUND OF THE INVENTION

This invention relates generally to binary numbering systems in digial computers, particularly the range and sign representations.

The usual binary number format in digital processing for representing a number range of from 0 to 1 is a multi-bit unsigned binary number. In processing applications where numbers are generated outside of the 0 to 1 range, they are clamped to an extreme value of that range before being handled by the processor. This can result in certain inaccuracies.

Also, this usual binary numbering system results in representing the real numbers inaccurately in order to facilitate processing. For example, an 8-bit unsigned binary number can represent the range of from 0/255 through 255/25. Multiplying two such 8-bit numbers A and B should produce the product (A) (B)/255. However, division by 255 is computationally difficult, so the denominator of 255 is often changed to 256 in order to simplify the computation. This necessitates ignoring one fraction N/256 since the method results in 257 fractions in the range, and only 256 such fractions can be represented. Unless specific measures are taken, the usual number not represented is 256/256, or 1.0.

Therefore, it is a primary object of the present invention to provide a binary numbering system that does not inherently include such inaccuracies and which can accurately handle out of range numbers.

SUMMARY OF THE INVENTION

This and additional objects are accomplished by the present invention, wherein, briefly, the real number range represented by a set of binary numbers is extended from below 0 to something in excess of unity, and the two most significant bits of the binary words are utilized to indicate their sign. The wider range means that the processor can handle numbers outside of the 0 to 1 range without having to clamp such intermediate results to a number within that range, thus reducing errors of computation. The technique further allows the accurate representation of the real number 1.0. This binary numbering system is particularly suited for use in a computer graphics system wherein intensity and color signals need to be accurately developed for display.

Additional objects, features and advantages of the present invention will become apparent from the following detailed description which should be taken in conjunction with the accompanying drawings.

BRIEF DESCRIPTION OF THE DRAWINGS

FIG. 1 illustrates, very generally, portions of a computer system utilizing the improvements of the present invention;

FIGS. 2 and 3 illustrate the formats of two binary words used in the system portion of FIG. 1;

FIG. 4 is a table which illustrates an example binary numbering system according to the present invention.

DESCRIPTION OF THE PREFERRED EMBODIMENT

Figure 5:
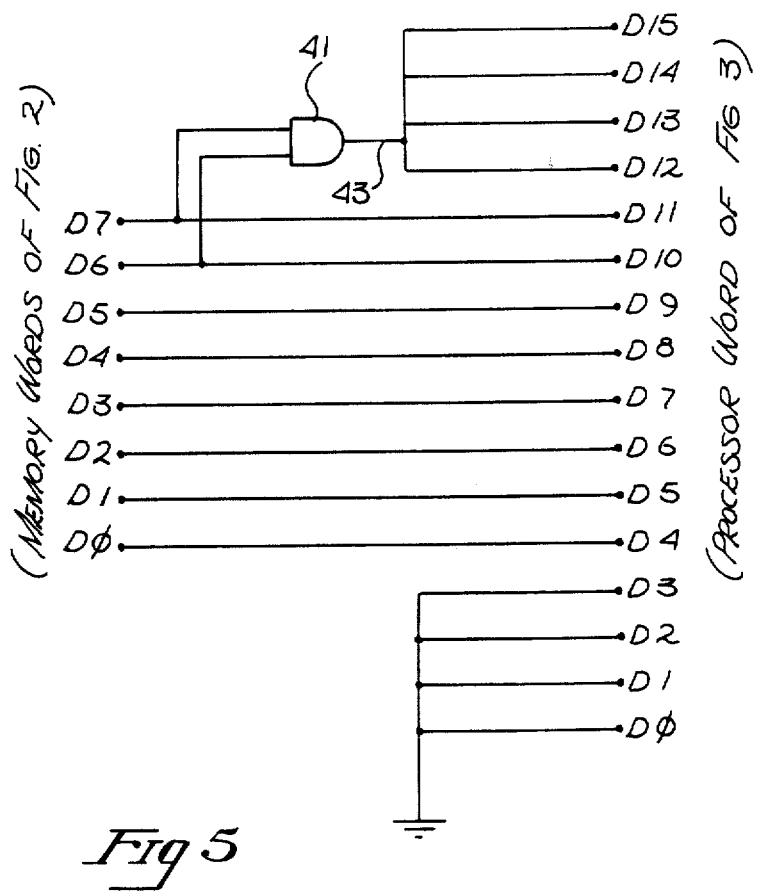
FIG. 5 is a circuit diagram of an element of the system of FIG. 1 which allows it to implement the binary numbering system of FIG. 4.

Referring initially to FIG. 1, a portion of a typical computer system is shown in block diagram form as a basis for explaining the new numbering system used by it. A binary number processor 11 is connected to a memory system 13 through a buffer circuit 15 and data bus portions 17 and 19. In this example, the memory 13 is illustrated to store 8-bit words having a format illustrated in FIG. 2. The memory words are converted by circuits in the buffer 15 (described hereinafter with respect to FIG. 5) into a 16-bit format for use by the processor 11. This 16-bit format is illustrated in FIG. 3.

The 8-bit binary words of data information stored in the memory 13, as illustrated in FIG. 2, make full utilization of a limited memory size. But most current processors are capable of manipulating and temporarily storing 16-bit binary words. The extra 8-bits are often used for various purposes, such as to indicate sign of the binary words, provide additional accuracy for intermediate products, and the like. In the example being described, the memory word bits D0–D7 are transferred by the buffer 15 to corresponding bit positions D4–D11 of the processor word, indicated as segment 21 in FIG. 3. The processor 11 is assumed in this example to be operating with a fixed decimal point, indicated by an arrow 23, between the most significant bit D11 and the next most significant bit D10 of the binary word portion 21. The word portion 25, bits D12–D15, are all set to have the same value, a "1" for a negative number and a "0" for a positive number. A negative number is indicated when both of the bits D10 and D11 are "1", and a positive number is indicated for any other bit combination. This is illustrated in the numbering system example of the table of FIG. 4 and implemented by the circuit of FIG. 5. A remaining portion 27 of the word illustrated in FIG. 3, namely bits D0–D3, are available for internal use in the processor.

Referring to the table of FIG. 4, the 8-bit words in the memory have 256 different combinations. The binary numbers 0–255, rather than representing a real number range of only 0 to 1, the usual case, is divided into portions. A first portion 29, including binary numbers 0–128, in this example, correspond to real numbers 0–1. The remaining binary numbers 129–255 are then available to handle real numbers outside of that range. A portion 31, including binary numbers 129–191, represent real numbers between 1.0 and 1.5. A final portion 33, including binary numbers 192–255, represents negative numbers from −0.5 to 0.

This binary numbering system thus allows out of range numbers to be both stored in the memory 13 and manipulated in the processor 11. The most significant bit positions 35 and 37 indicate whether the number is positive or negative. It will be noted that the bits in those two positions are all "1" for all of the negative numbers in the portion 33 of FIG. 4. The most significant bit in position 35 performs a double duty. It is a "1's" bit when the next to the most significant bit, in position 37, is "0" and a sign bit when the bit in position 37 is a "1".

Referring to FIG. 5, an AND gate 41 has two inputs, one of which is connected to the line carrying the most significant bit D7 of the memory word, and the other connected to the line carrying the next to the most significant bit D6. When both of those are 1's, an output in a line 43 is a 1, indicating the binary number to be negative. On the other hand, if either of the bits D6 or D7 is a "0", the output in the line 43 will be a "0", indicating a positive number. Each of the bits D12–D15 of the processor word shown in FIG. 3 is set to the output value of the AND gate 41 by their bit lines all being connected to the line 43.

The technique described so far has also been utilized for 12-bit memory words, something that is desirable for high-resolution computer graphics applications. In that case, the system illustrated in the Figures is modified so that the 12-bit memory word D0–D11 is connected directly through to bit positions D0–D11 of the processor word by the circuit of FIG. 5. That is, rather than the processor word bit positions D0–D3 being unused, as shown in FIG. 5, they are now utilized to carry the additional 4 bits of the memory binary words. In this modified example, it is still the two most significant bits that determine the sign of the binary number, its sign being set into each of the bit positions D12–D15 of the processor word.

Although the present invention has been described with respect to specific examples thereof, it will be understood that the invention is entitled to protection within the full scope of the appended claims.

It is claimed:

1. A computer system, comprising:
   a memory for storing memory binary words having a first number of bits;
   a processor for manipulation of processor binary words having a second number of bits greater than said first number of bits;
   said first number of bits including at least 2 most significant bits, and said second number of bits including at least 4 most significant bits,
   sign bit setting means disposed between said memory and said processor for setting at least one signed bit of a binary word supplied from the memory to the processor, said signed bit having a sign which is a function of the two most significant bits of the memory binary words, said sign bit setting means setting at least one of said 4 most significant bits of said second number of bits to a first logical value when said two most significant bits of said first number of bits have a first logical value, said 4 most significant bits indicating a sign of said binary word having a second number of bits.

2. The computer system according to claim 1 wherein said sign bit setting means comprises an AND gate connected to receive the two most significant memory binary word bits, an output of said AND gate being used to set said 4 most significant bits of said processor binary words in order to indicate their sign.

3. The computer system according to claim 1 wherein said first number of bits is equal to 8 and said second number of bits is equal to 16.

4. The computer system according to claim 1 wherein said computer system is especially adapted for processing graphics information.

5. The computer system according to claim 4 wherein said first number of bits is equal to 12 and said second number of bits is equal to 16.

6. A computer system comprising:
   a memory for storing a first plurality of binary words having a first number of bits;
   a first portion of said first plurality of binary words representing a real number range of 0–1;
   a second portion of said first plurality of binary words representing a real number range of 1.0–1.5;
   a third portion of said first plurality of binary words representing a real number range of negative 0.5–0;
   a processor for manipulating a second plurality of binary words having a second number of bits, said second number of bits being greater than said first number of bits, said first number of bits including two most significant bits, said second number of bits including 4 most significant bits;
   sign setting means disposed between said memory and said processor for setting at least one of said 4 most significant bits supplied from the memory to the processor, representing a sign of one of said second plurality of binary words, said sign being a function of said two most significant bits of said binary word.

7. A computer system according to claim 6 wherein said signed bit setting means comprises an AND gate connected to receive two most significant memory binary word bits, said AND gate having an output used to set at least one bit of said four most significant bits of said processor binary words in order to indicate their sign.

8. The computer system according to claim 6 wherein said first number of bits is equal to 8 and said second number of bits is equal to 16.

9. The computer system according to claim 6 wherein said first number of bits is equal to 12 and said second number of bits is equal to 16.

* * * * *